United States Patent
Brody, II et al.

[11] Patent Number: 5,870,841
[45] Date of Patent: Feb. 16, 1999

[54] VEHICLE LICENSE PLATE HOLDER

[76] Inventors: William M. Brody, II, 3905 Dancing Star Way Northwest, Albuquerque, N. Mex. 87120; James R. Willis, 1534 SW. 96 St., Oklahoma City, Okla. 73159

[21] Appl. No.: 856,554

[22] Filed: May 15, 1997

[51] Int. Cl.$^6$ .................................................. G09F 7/00
[52] U.S. Cl. ............................. 40/200; 40/209; 40/643; 40/661; 40/661.07
[58] Field of Search ............................. 40/200, 209, 643, 40/655, 661, 661.06, 661.07, 705

[56] References Cited

U.S. PATENT DOCUMENTS

| | | | |
|---|---|---|---|
| 1,534,151 | 4/1925 | Bahsler | 40/643 |
| 1,537,899 | 5/1925 | Stubbs | 40/661.06 |
| 1,573,113 | 2/1926 | Irie . | |
| 1,886,352 | 11/1932 | Nickerson, Jr. | 40/209 |
| 2,791,046 | 5/1957 | Goldberg | 40/10 |
| 3,263,358 | 8/1966 | Dosie et al. | 40/209 |
| 3,274,723 | 9/1966 | Jacobs | 40/209 |
| 3,304,642 | 2/1967 | Dardis | 40/209 |
| 3,340,640 | 9/1967 | Savage | 40/209 |
| 3,432,954 | 3/1969 | Ford | 40/643 X |
| 3,702,510 | 11/1972 | Genyk et al. | 40/209 |
| 4,337,590 | 7/1982 | Jackson | 40/661 X |
| 4,524,867 | 6/1985 | Klein et al. | 40/661 X |
| 4,571,865 | 2/1986 | Ackeret | 40/655 |
| 4,736,539 | 4/1988 | Dickinson | 40/209 X |
| 4,813,167 | 3/1989 | Means | 40/210 |
| 5,359,798 | 11/1994 | Pelosi | 40/661.06 |
| 5,392,548 | 2/1995 | Truc et al. | 40/705 |
| 5,502,912 | 4/1996 | LeBoff et al. | 40/643 |

FOREIGN PATENT DOCUMENTS

| | | | |
|---|---|---|---|
| 313747 | 5/1989 | European Pat. Off. | 40/200 |
| 3742428 | 7/1989 | Germany | 40/200 |
| 3821762 | 1/1990 | Germany | 40/209 |
| 661012 | 6/1987 | Switzerland | 40/209 |

*Primary Examiner*—Kenneth J. Dorner
*Assistant Examiner*—Andrea Chop
*Attorney, Agent, or Firm*—John L. Gray; Kegler,Brown, Hill & Ritter

[57] ABSTRACT

A license plate holder provided with a flat backing plate to which a transparent cover is hinged at the base thereof and which may be readily removable from the backing plate at the top thereof.

1 Claim, 2 Drawing Sheets

5,870,841

VEHICLE LICENSE PLATE HOLDER

BACKGROUND OF THE INVENTION

Over the years, there have been a number of devices proposed to hold a license plate so that it is displayed on a motor vehicle. These are shown in such patents as U.S. Pat. Nos. 1,573,113, Irie; 2,791,046, Goldberg; 3,263,358, Dosie, et al.; 3,304,642, Dardis; 3,340,640 Savage; 3,702,510 Genyk, et al.; and 4,813,167, Means. In addition, German Patent No. CH 661012A, Bains, also shows such a device.

None of these disclosures provide a cheap, readily accessible, easily opened license plate holder for use by automobile salesmen to insert the dealers license tag prior to demonstrating the vehicle to a potential buyer which can also be used as a receptacle to hold the temporary license plate when the vehicle is sold.

The current procedure for dealers is to attach the dealer's plate to a rear part of the vehicle such as the trunk by magnets when demonstrating an automobile, or to the rear window by tape, or by screwing them to the license plate cavity of the vehicle. The disadvantages of these are that the use of magnets can result in scratching the vehicle's paint, taping them to the rear window restricts the view through the window and may cause an accident, and by having to screw the license plate to the cavity takes too much of the selling time of the salesman.

BRIEF SUMMARY OF THE INVENTION

Applicant's invention comprises an extruded, two-piece transparent plastic license plate holder hingedly connected which can be secured to the motor vehicle so that the license plate will be safely held in the holder. The device may readily be re-opened without the use of tools so as to permit the license plate to be removed.

The license plate holder can also function as an attractive receptacle to carry the permanent license plate issued to the new vehicle buyer or, in the event that only one license plate is issued in a particular state, to provide an attractive receptacle to hold the dealership's advertising tag in the other receptacle.

It is therefore an object of this invention to provide such a license plate holder which is cheap, sturdy, transparent, easily installed, and which may be readily closed and opened so that a license plate may be inserted therein and safely held therein and readily removed.

This, together with other objects of the invention, will become apparent from the following detailed description of the invention and the accompanying drawings.

DETAILED DESCRIPTION OF THE INVENTION

Figure 1:
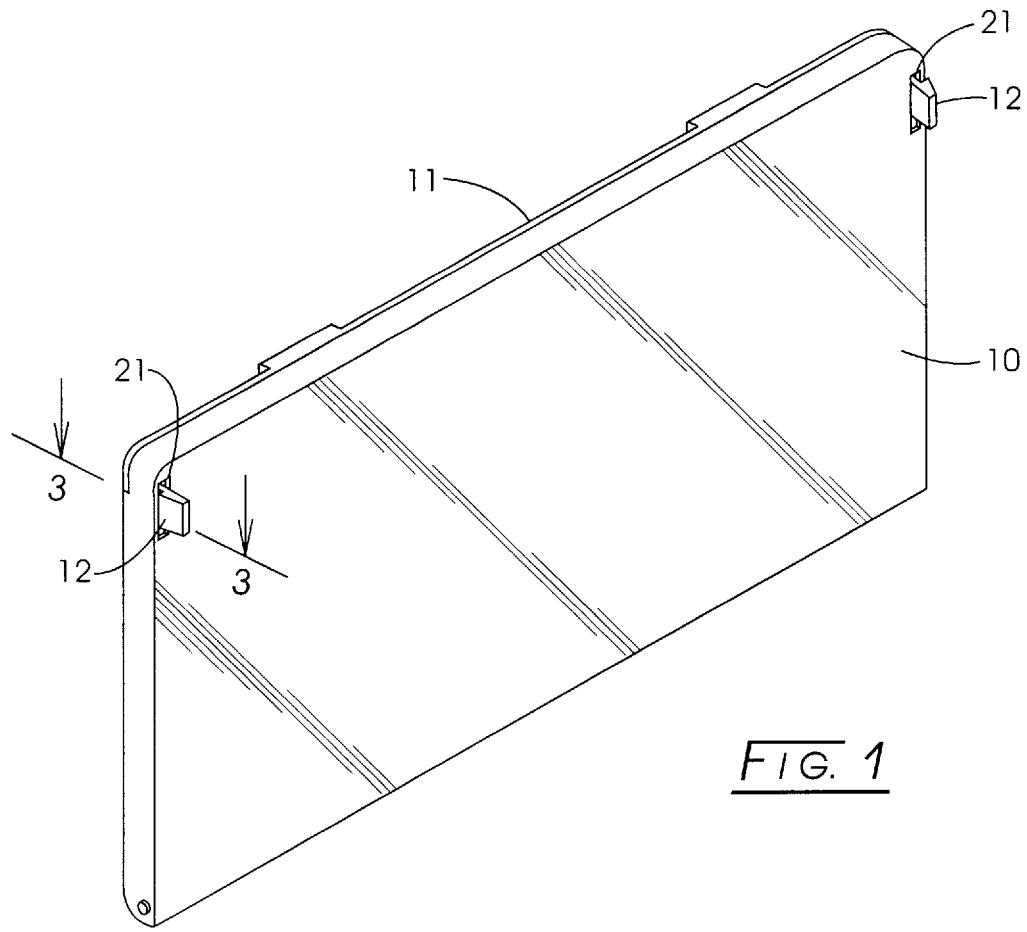
FIG. 1 is a perspective view of Applicant's invention with the hinged front transparent cover portion thereof secured to the flat backing plate.
Figure 2:
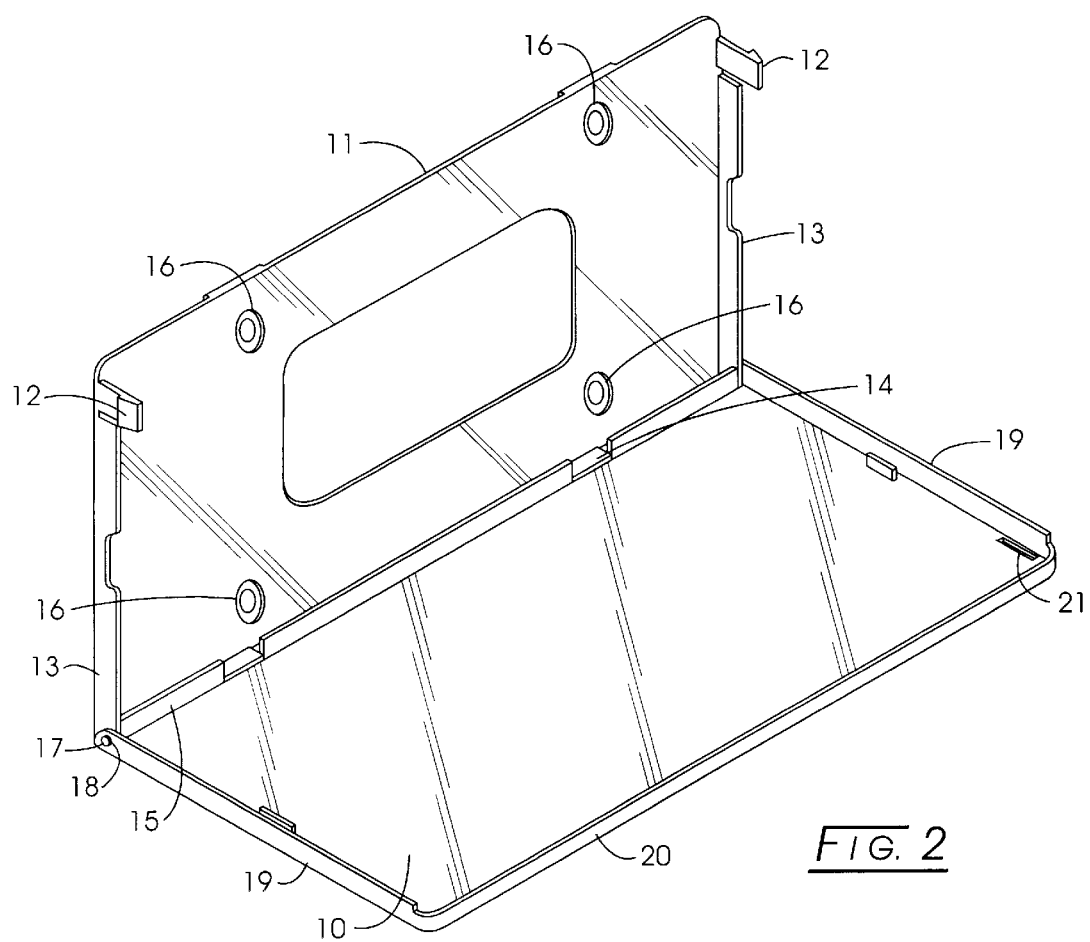
FIG. 2 is a perspective view showing the hinged front transparent cover open and the flat backing plate.

Referring more particularly to the figures, FIG. 1 shows the front transparent cover 10 folded up against the flat backing plate 11 and being held in place by catches 12—12 in slots 21—21, which are also shown in FIG. 2.

Referring to FIG. 2, the flat backing plate 11 is shown provided with side pieces 13—13 and a base piece 14 as well as a bottom front piece 15 and holes 16—16 adapted to receive attaching devices to attach the back plate to the motor vehicle. The catches 12—12 are shown attached to the flat backing plate 11. The flat backing plate 11 is provided with studs 17—17 which is shown, and there is an opposite one not shown, each of the studs 17—17 fits through holes 18—18 on the opposite side pieces 19—19 of the front transparent cover 10 so that the front transparent cover 10 may be hingedly tipped up to cover the license plate. The front transparent cover 10 is also provided with a top piece 20 also extending at right angles similar to the side pieces 19—19 and the front transparent cover 10 is also provided with slots 21—21 which is shown, and there is an opposite one not shown in this FIG. 2, but which is shown in FIG. 1, adapted to engage the catches 12—12 when the front transparent cover 10 is raised to an upright position.

Figure 3:
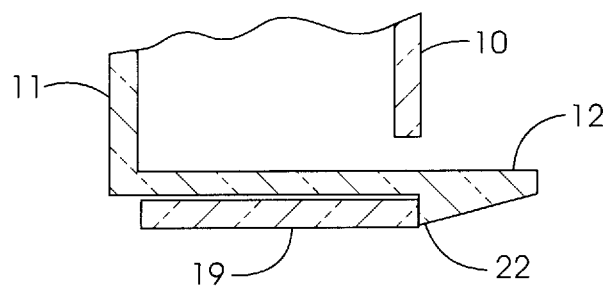
FIG. 3 is a view on section 3—3 of FIG. 1 showing the means for releasably attaching the front transparent cover to the flat backing plate.

Referring now to FIG. 3, flat backing plate 11 is shown with catch 12 which is provided with a sharp edged outwardly extending sloping portion 22 so that when the front transparent cover 10 is placed in an upright position the catch 12 will extend through the slot 21 and hold the front transparent cover 10 in position. In order to release the front transparent cover 10, it is merely necessary to bend the catch 12 inward so that the sloping portion 22 of catch 12 does not engage the side piece 19 and thus the front transparent cover 10 may be pulled forward.

In using Applicant's invention, either to hold a license plate temporarily as in a dealer demonstration situation or for longer periods of time or to hold a dealership advertisement display, the license plate or dealership advertisement is placed against the flat backing panel 11 and is held from sideways ejection by side pieces 13—13 and is supported by bottom pieces 14 and 15. When the front transparent cover 10 is closed, and the top piece 20 is closed by means of catches 12—12 engaging the slots 21—21, the top piece 20 will prevent the license plate from being jarred upwardly out of position.

The pieces that make up this device are made by plastic injection molding techniques which may be injection molded simultaneously. Following the molding operation the pieces may be readily put together for shipping. Consequently, very little labor is involved in making this product.

Because of the design of the license plate cavity on modern vehicles, it may be necessary for the user to separate the transparent cover portion from the flat backing plate in order to attach the backing plate to the vehicle. This can be done very easily and then the transparent cover may be easily re-hinged when the flat backing plate has been connected to the vehicle.

Since the entire front face of the cover is transparent, this satisfies various state laws directing that all of the information printed on the front face of the license plate be clearly visible from a distance of fifty feet.

This invention contemplates the possibility of a different type of hinge arrangement. For example, snap hinges running along the bottom edge of the flat backing plate to attach to the transparent cover would be an alternative.

While this invention has been shown and described with respect to a detailed embodiment thereof, it will be understood by those skilled in the art that various changes in form and detail thereof may be made without departing from the scope of the claims of the invention.

What is claimed is:

1. A license plate holder comprising a flat backing plate in the shape of a rectangle having oppositely disposed parallel, horizontal and vertical sides wherein said horizontal sides are longer than said vertical sides, one of said horizontal sides defining a lower side; each of said vertical sides having a lower end at said lower side and an opposite upper end;

means on said plate enabling it to be attached to a motor vehicle;

said plate being provided with extensions at right angles thereto on each of said vertical sides and on said one horizontal lower side;

said extensions being of a size to support a license plate and to prevent said license plate from substantial horizontal movement;

a front transparent cover of approximately the same size and shape as said flat backing plate, said cover having oppositely disposed parallel, horizontal and vertical sides, one of said horizontal sides defining an upper side, said cover being hingedly attached to the lower ends of each of said vertical sides of said flat backing plate, said cover being provided with extensions at right angles to said cover on each of said vertical sides and on said one horizontal upper side so as to prevent upward movement of said license plate when said transparent cover is in position in front of said backing plate;

said backing plate being provided with, at the upper end of each vertical side thereof, vertical flat members extending from said backing plate, each of said members being provided with a tapered end thereon which terminates in a portion that is at right angles to each of said members approximately midway the length of each said member;

said transparent cover being provided with vertical slots therein adjacent each vertical side thereof and so positioned so as to fit over said flat members extending from said backing plate and spaced apart so that the cover slots may be forced over said flat members causing said flat members to be bent slightly towards one another and then be positioned behind the right angle portion of said flat members and be held there as the flat members regain their position.

* * * * *